United States Patent
Jayaraman et al.

(10) Patent No.: US 10,671,926 B2
(45) Date of Patent: *Jun. 2, 2020

(54) METHOD AND SYSTEM FOR GENERATING PREDICTIVE MODELS FOR SCORING AND PRIORITIZING OPPORTUNITIES

(71) Applicant: SERVICENOW, INC., Santa Clara, CA (US)

(72) Inventors: Baskar Jayaraman, Fremont, CA (US); Debashish Chatterjee, Fremont, CA (US); Kannan Govindarajan, Sunnyvale, CA (US); Ganesh Rajan, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 15/405,041

(22) Filed: Jan. 12, 2017

(65) Prior Publication Data

US 2017/0124458 A1    May 4, 2017

Related U.S. Application Data

(63) Continuation-in-part of application No. 15/009,042, filed on Jan. 28, 2016, now Pat. No. 9,582,759, which
(Continued)

(51) Int. Cl.
  *G06N 5/02* (2006.01)
  *G06F 16/22* (2019.01)
  *G06N 20/00* (2019.01)

(52) U.S. Cl.
  CPC ............ *G06N 5/02* (2013.01); *G06F 16/22* (2019.01); *G06N 20/00* (2019.01)

(58) Field of Classification Search
  USPC .......................................................... 706/46
  See application file for complete search history.

(56) References Cited

U.S. PATENT DOCUMENTS 6,820,089 B2   11/2004   Vishnubhotla
7,249,048 B1    7/2007   O'Flaherty
(Continued)

FOREIGN PATENT DOCUMENTS

EP     1168198 A2     1/2002
WO   2015001558 A1    1/2015

OTHER PUBLICATIONS

Empirical Study on the Efficiency of Search Based Test Generation for EFSM Models Zhao, R.; Harman, M.; Zheng Li Software Testing, Verification, and Validation Workshops (ICSTW), 201 O Third International Conference on Year: 2010 pp. 222-231, DOI: 10.1109/ICSTW.2010.44 Referenced in: IEEE Conference Publications.

(Continued)

Primary Examiner — Michael B Holmes
(74) Attorney, Agent, or Firm — Fletcher Yoder PC

(57) ABSTRACT

A computer implemented system for automating the generation of an analytic model includes a processor configured to process a plurality of data sets. Each data set includes values for a plurality of variables. A time-stamping module is configured to derive values for a plurality of elapsed-time variables for each data set, and the plurality of variables and plurality of elapsed-time variables are included in a plurality of model variables. A model generator is configured to create a plurality of comparison analytic models each based on a different subset of model variables. Each comparison analytic model is configured to operate on new data sets associated with current opportunities, and to output a likelihood of successfully closing each current opportunity. A
(Continued)

model testing module is configured to select an operational analytic model from among the comparison analytic models based on a quality metric.

23 Claims, 3 Drawing Sheets

Related U.S. Application Data is a continuation of application No. 14/093,403, filed on Nov. 29, 2013, now Pat. No. 9,280,739.

(60) Provisional application No. 61/731,595, filed on Nov. 30, 2012.

(56) References Cited

U.S. PATENT DOCUMENTS

| | | | |
|---|---|---|---|
| 7,257,566 B2 | 8/2007 | Danielson et al. | |
| 7,389,211 B2 | 6/2008 | Abu El Ata et al. | |
| 7,548,900 B2 | 6/2009 | Weiler et al. | |
| 7,644,863 B2 | 1/2010 | Chen et al. | |
| 7,827,141 B2 | 11/2010 | Bande et al. | |
| 7,930,302 B2 | 4/2011 | Bandaru et al. | |
| 7,930,344 B2 | 4/2011 | Chidambaran et al. | |
| 8,161,536 B1 | 4/2012 | Subramaniam et al. | |
| 8,209,201 B1 | 6/2012 | Yuasa et al. | |
| 8,300,777 B1 | 10/2012 | Lerda et al. | |
| 8,365,193 B2 | 1/2013 | Chidambaran et al. | |
| 8,380,648 B2 | 2/2013 | Matson et al. | |
| 8,483,366 B2 | 7/2013 | Lerda et al. | |
| 8,493,869 B2 | 7/2013 | Udupi et al. | |
| 8,589,273 B2 | 11/2013 | Creeden et al. | |
| 8,656,269 B1 | 2/2014 | Yuasa et al. | |
| 8,781,845 B1 | 7/2014 | Burg et al. | |
| 8,825,805 B2 | 9/2014 | Gollapudi et al. | |
| 8,958,775 B2 | 2/2015 | Lerda et al. | |
| 8,983,975 B2 | 3/2015 | Kenton et al. | |
| 9,031,209 B2 * | 5/2015 | Lerda | H04M 1/56 379/88.11 |
| 9,244,938 B2 * | 1/2016 | Gollapudi | H04L 69/04 |
| 9,280,739 B2 * | 3/2016 | Jayaraman | G06N 5/02 |
| 9,367,299 B2 * | 6/2016 | Patton | G06F 8/61 |
| 9,582,759 B2 * | 2/2017 | Jayaraman | G06N 5/02 |
| 10,198,698 B2 * | 2/2019 | Jayaraman | G06N 7/005 |
| 10,339,441 B2 * | 7/2019 | Jayaraman | G06N 20/00 |
| 10,380,504 B2 * | 8/2019 | Bendre | H04L 67/32 |
| 10,445,661 B2 * | 10/2019 | Bendre | G06F 17/27 |
| 10,459,962 B1 * | 10/2019 | Jayaraman | G06F 16/3347 |
| 2003/0033275 A1 | 2/2003 | Alpha et al. | |
| 2003/0065557 A1 | 4/2003 | Hoffman et al. | |
| 2003/0107592 A1 | 6/2003 | Li et al. | |
| 2003/0220860 A1 | 11/2003 | Heytens et al. | |
| 2005/0055369 A1 | 3/2005 | Gorelik et al. | |
| 2005/0071217 A1 | 3/2005 | Hoogs et al. | |
| 2006/0129447 A1 | 6/2006 | Dockery et al. | |
| 2006/0167856 A1 | 7/2006 | Angele et al. | |
| 2007/0088703 A1 | 4/2007 | Kasiolas et al. | |
| 2007/0133522 A1 | 6/2007 | Morgan | |
| 2008/0133488 A1 | 6/2008 | Bandaru et al. | |
| 2010/0121707 A1 | 5/2010 | Goeldi | |
| 2011/0055127 A1 | 3/2011 | Umblijs | |
| 2011/0178905 A1 | 7/2011 | Kagarlis et al. | |
| 2012/0095804 A1 | 4/2012 | Calabrese et al. | |
| 2012/0324023 A1 | 12/2012 | Di Sciullo et al. | |
| 2013/0339337 A1 | 12/2013 | Alkhateeb et al. | |
| 2015/0134401 A1 | 5/2015 | Heuer et al. | |
| 2015/0142713 A1 | 5/2015 | Gopinathan et al. | |

OTHER PUBLICATIONS

An Approach for Incorporating Context in Building Probabilistic Predictive Models Wu, J.A.; Hsu, W.; Bui, A.A.T. Healthcare Informatics, Imaging and Systems Biology (HISB), 2012 IEEE Second International Conference on Year: 2012 pp. 96-105, DOI: 10.1109/HISB.2012.30 Referenced in: IEEE Conference Publications.

Smart grid data analytics for decision support Ranganathan, P.; Nygard, K. Electrical Power and Energy Conference (EPEC), 2011 IEEE Year: 2011 pp. 315-321, DOI: 10.1109/EPEC.2011.6070218 Referenced in: IEEE Conference Publications.

A hybrid nonlinear model for the annual maximum simultaneous electric power demand Shakouri G, H.; Rastad, M.; Nazarzadeh, J. Power Systems, IEEE Transactions on Year: 2006, vol. 21, Issue: 3 pp. 1069-1078, DOI: 10.1109/TPWRS.2006.873105 Referenced in: IEEE Journals & Magazines.

* cited by examiner

METHOD AND SYSTEM FOR GENERATING PREDICTIVE MODELS FOR SCORING AND PRIORITIZING OPPORTUNITIES

CROSS REFERENCE TO RELATED APPLICATIONS

This application is a continuation-in-part of U.S. patent application Ser. No. 15/009,042, filed on Jan. 28, 2016, which is a continuation and claims the priority of U.S. patent application Ser. No. 14/093,403, filed on Nov. 29, 2013, which claims the priority of U.S. Provisional Patent Application Ser. No. 61/731,595, filed on Nov. 30, 2012, the contents of all of which are incorporated herein in their entireties.

BACKGROUND

1. Technical Field

The present disclosure relates to the field of data modeling. Particularly, the present disclosure relates to automatic generation of business decision analytic models.

2. Description of the Related Art

The task of model generation, especially generation of models which are business centric and involved in business decision making, is a task that depends on availability and scrutiny of large volume of information. The process of model generation has always been an information centric process which dwells on the availability of quality information corresponding to the problem domain the analytic model is expected to cater to.

However, given the exponential increase in the amount/volume of data available with respect to any particular problem domain, the task of choosing the right set of data/variables for model generation becomes a cumbersome task. Wide spread use of the internet and collaboration and consumer platforms like social media and online shopping are resulting in enormous amount of data being generated via blogs, social interactions, product reviews etc. In addition, the machines being used in the process (computers, smart phones, network equipment and the like) are also contributing to the data growth.

The availability of larger volumes of data has resulted in a situation where selecting an appropriate set of variables for model creation becomes a cumbersome task. Further, until recently analytic model generation was carried out manually. The process of manual generation of analytic/predictive models was a complicated task by itself and required huge investments in terms of time-frames and man power. Moreover, human decisions and judgments in terms of variable selection for model generation are prone to errors which could in turn compromise the efficiency and effectiveness of the generated analytic models.

Therefore, there was felt a need for a system which obviated manual intervention and automated the entire process of model generation. Moreover, another challenge in the arena of model generation was to generate a model that is adaptable and flexible enough to incorporate the changes in the data inflow. Therefore, there was felt a need for system that not only automated the generation of analytic models, especially business critical analytic models but also converts unstructured data into structured information before using the same in the process of model generation. There was also felt a need for a system which puts in to use the phenomenon of automation in order to bring down the time associated with model creation and model updating. There was also felt a need for a system that is capable of automatically regenerating a previously created analytic model based on the inflow of newer data.

The above mentioned shortcomings, disadvantages and problems are addressed herein and which will be understood by reading and studying the following specification.

SUMMARY

In one aspect, a computer implemented system for automating the generation of an analytic model is provided. The system includes a processor communicatively coupled to a database. The database is configured to store a plurality of data sets. Each of the data sets includes values for a plurality of variables. The processor is configured to process the data sets. The processor includes a time-stamping module configured to derive values for a plurality of elapsed-time variables for each data set. Each elapsed-time variable represents an elapsed time between a respective pair of dated events associated with the respective data set. The plurality of variables and the plurality of elapsed-time variables are included in a plurality of model variables. The processor also includes a model generator configured to create a plurality of comparison analytic models. Each comparison analytic model is based on a different subset of the plurality of model variables. Each comparison analytic model is configured to operate on new data sets associated with current opportunities, and to output a representation of a likelihood of successfully closing each current opportunity. The processor further includes a model testing module configured to select an operational analytic model from among the plurality of comparison analytic models based on a quality metric applied to each of the plurality of comparison analytic models.

In another aspect, a method for automating generation of an analytic model is provided. The method includes the computer-implemented step of accessing a plurality of data sets. Each of the data sets includes values for a plurality of variables. The method also includes the computer-implemented step of deriving values for a plurality of elapsed-time variables for each data set. Each elapsed-time variable represents an elapsed time between a respective pair of dated events associated with the respective data set. The plurality of variables and the plurality of elapsed-time variables are included in a plurality of model variables. The method further includes the computer-implemented step of creating a plurality of comparison analytic models. Each comparison analytic model is based on a different subset of the plurality of model variables. Each comparison analytic model is configured to operate on new data sets associated with current opportunities, and to output a representation of a likelihood of successfully closing each current opportunity. In addition, the method includes the computer-implemented steps of calculating a quality metric for each of the plurality of comparison analytic models, and selecting an operational analytic model from among the plurality of comparison analytic models based on the quality metric.

In another aspect, a computer-readable medium having computer-executable instructions for automating generation of an analytic model is provided. When executed by at least one processor, the computer-executable instructions cause the at least one processor to access a plurality of data sets. Each of the data sets includes values for a plurality of variables. The computer-executable instructions also cause the at least one processor to derive values for a plurality of elapsed-time variables for each data set. Each elapsed-time variable represents an elapsed time between a respective pair of dated events associated with the respective data set. The plurality of variables and the plurality of elapsed-time variables are included in a plurality of model variables. The computer-executable instructions further cause the at least one processor to create a plurality of comparison analytic models. Each comparison analytic model is based on a different subset of the plurality of model variables. Each comparison analytic model is configured to operate on new data sets associated with current opportunities, and to output a representation of a likelihood of successfully closing each current opportunity. In addition, the computer-executable instructions cause the at least one processor to calculate a quality metric for each of the plurality of comparison analytic models, and select an operational analytic model from among the plurality of comparison analytic models based on the quality metric.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION

Figure 1:
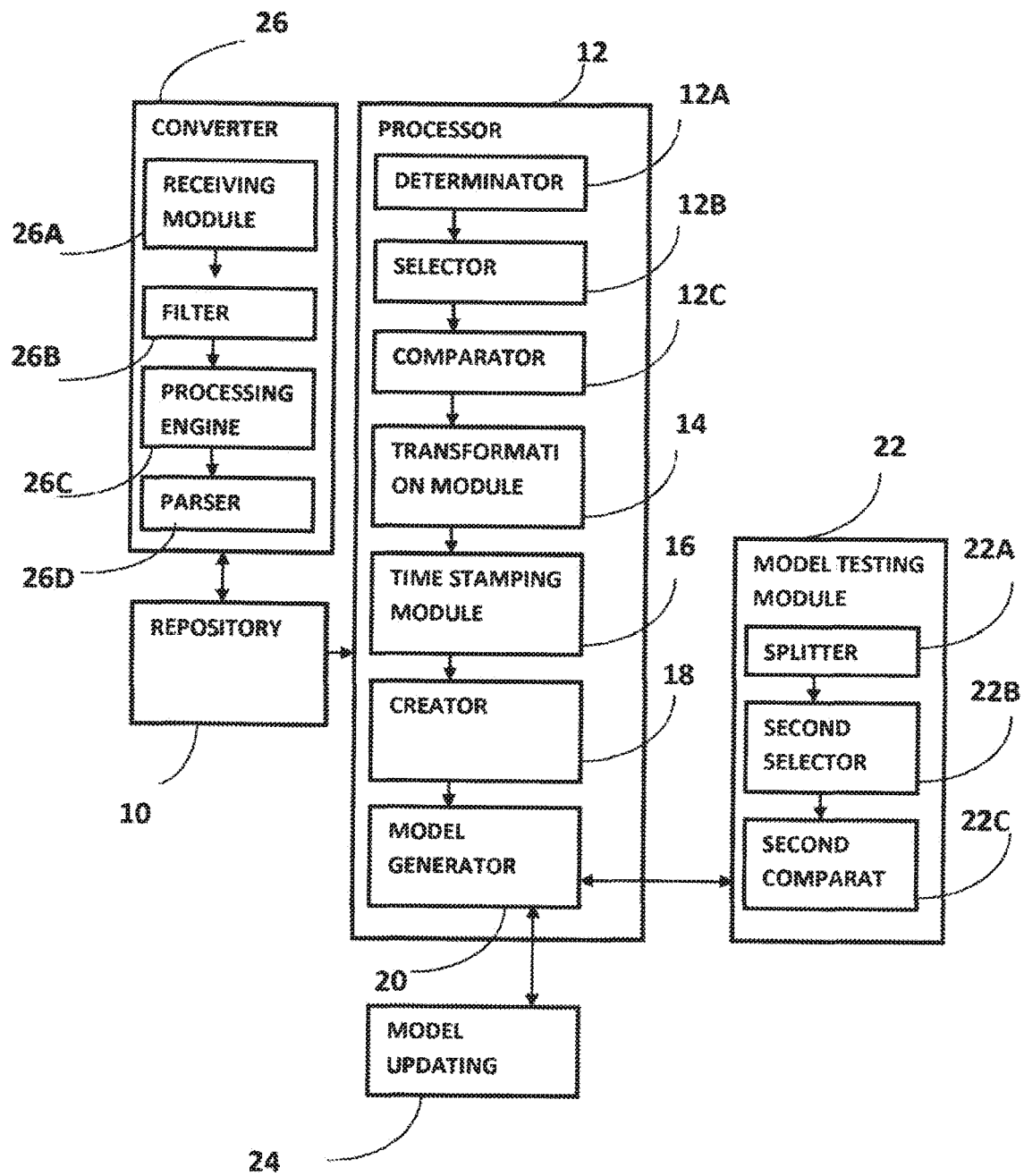
FIG. 1 is a system level block-diagram illustrating the components of the computer-implemented system for automating the generation of business decision analytic model.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments described herein envisage a computer implemented system and method for automating the generation of an analytic model, typically a business decision analytic model. The system and method propose breaking down the steps involved in model generation and provide for rapid building, utilization and automated maintenance of the analytic model. The system and method automate the process of analytic model building by utilizing specifically designed software tools, thereby reducing the build time and use time associated with analytic models. In addition, the embodiments described herein also provide for quality enhancement of the created analytic models by enabling automatic model selection and automatic model regeneration.

The embodiments described herein provide a system and method that generates structured information from unstructured data.

The embodiments described herein also provide a system and method that automatically computes modeling variables including transformations, for generation of relatively effective analytic models.

The embodiments described herein also provide a system and method that automatically tests the generated models for efficiency and selects the model with optimal efficiency.

The embodiments described herein also provide a system and method that generates a problem-appropriate library of analytic models.

The embodiments described herein also provide a system and method that automates the generation of business decision analytic models.

The embodiments described herein also provide a system and method that provides for rapid building, ease of use and management of analytic models.

The embodiments described herein envisage a computer implemented system for automating the generation of an analytic model. The system comprises a repository configured to store a plurality of data sets, each of the data sets comprising at least predicted variables, the predicted variables utilized for generating the analytic model.

The system further comprises a processor configured to process the data sets. The processor includes a determinator configured to determine the total number of records present in each of the data sets, the determinator further configured to determine the columns of the data sets containing only numerical values.

The processor further comprises a selector cooperating with the determinator and configured to select a column containing only numerical values, from a dataset under consideration, the selector comprising a counter configured to count the number of unique numerical values in selected column, the counter further configured to count the total number of records present in selected column.

The processor further comprises a comparator configured to compare the number of unique values in the selected column and the total number records in the selected column.

The processor further comprises a transformation module configured to transform the selected column by applying a non-linear transformation to each of the values in the selected column and generate respective transformed values, in the event that the number of unique values in the selected column is less than the total records in the selected column, the transformation module further configured to replace the unique values with the transformed values.

The processor further comprises a time stamping module configured to determine whether there exists a time stamp corresponding to each of the rows in the dataset under consideration, the time stamping module further configured to calculate a plurality of time lags corresponding to each of the rows, the time lags having predetermined orders.

The processor further comprises a data creator configured to create a processed data set, the processed data set comprising a plurality of rows, each row containing columns having the transformed values.

The processor further comprises a model generator configured to create a first analytic model based on at least the processed data set.

The embodiments described herein also provide that the system further comprises a model testing module having access to a module quality evaluation metric, the model testing module configured to test the analytic model developed by the model creator.

The embodiments described herein also provide that the model testing module further comprises a splitter configured to split the processed data set into at least a first set and a second set.

The embodiments described herein also provide that the model testing module includes a second selector configured to select at least one data item for omission from the first set and the second set and create a new first set and new second set by omitting the selected data item, the second creator further configured to transmit the new first set and new second set to the model generator for generation of a second analytic model.

The embodiments described herein also provide that the model testing module further comprises a second comparator configured to compare the first analytic model with the second analytic model and determine whether the second analytic model is an enhancement over the analytic model in terms of model quality, the second comparator configured to exclude the data item from the new first set and second set in the event that the second analytic model is not an enhancement over the first analytic model in terms of quality.

The embodiments described herein also provide that the splitter is configured to split the processed data set into the first data set and second set in a chronological order, the chronological order identifying the order in which each of the rows of the processed dataset were previously created.

The embodiments described herein also provide that the splitter is configured to split the processed data set into the first set and second set in a pre-specified order, in the event that no chronological order data is available, the splitter further configured to randomly shuffle the data items in the processed data set prior to splitting the processed data set.

The embodiments described herein also provide that the system further includes a model updating module, the updating module configured to update the analytic model in a stateful manner.

The embodiments described herein also provide that the model updating module is further configured to update the analytic model in a stateless manner.

The embodiments described herein also provide that the system further comprises a converter configured to convert unstructured data into structured information, the convertor cooperating with the repository to store the structured information in the form of the data sets, the convertor comprising a receiving module configured to receive the unstructured data; a filter configured to filter the unstructured data to identify and retrieve a plurality of sections of unstructured data based on the relevance of the unstructured data to the creation of the analytic model, a natural language processing engine configured to receive the sections of unstructured data and break the sections into a plurality of meaningful sentences using natural language processing tools; and a parser configured to parse the plurality of meaningful sentences and retrieve a plurality of keywords from the meaningful sentences.

The embodiments described herein also provide that the convertor is further configured to assign a weight value and a sentiment value to each of the keywords, and categorize the keywords into a plurality of categories based on a predetermined categorization criteria thereby converting the unstructured data into structured data.

The embodiments described herein envisage a computer implemented method for automating the generation of an analytic model. The method, in accordance with the present disclosure comprises the following computer implemented steps: storing, in a repository, a plurality of data sets, each of the data sets comprising at least predicted variables, the predicted variables utilized for generating the analytic model; determining the total number of records present in each of the data sets, and determining the columns of the data sets containing only numerical values; selecting a column containing only numerical values, from a dataset under consideration; counting the number of unique values in selected column, and counting the total number of records present in the selected column; comparing the number of unique values in the selected column and the total number records in the selected column; transforming the selected column by applying a non-linear transformation to each of the values in the selected column and generating respective transformed values, only in the event that the number of unique values in the selected column is less than the total records in the selected column; replacing the unique values in each of the selected columns with the transformed values; determining whether there exists a time stamp corresponding to each of the rows in the dataset under consideration, and calculating a plurality of time lags corresponding to each of the rows, the time lags having predetermined orders; creating a processed data set, the processed data set comprising a plurality of rows, each row containing columns having the transformed values; and creating a first analytic model based on at least the processed data set.

The embodiments described herein also provide that the method further comprises the step of evaluating the first analytic model using a model quality evaluation metric, the step further comprising the following steps: splitting the processed data set into at least a first set and a second set; selecting at least one data item for omission from the first set and the second set and creating a new first set and new second set by omitting the selected data item, and transmitting the new first set and new second set to the model creator for creation of a second analytic model; and comparing the first analytic model with the second analytic model and determining whether the second analytic model is an enhancement over the first analytic model in terms of model quality, and excluding the selected data item from the new first set and second set in the event that the second analytic model is not an enhancement over the first analytic model, in terms of model quality.

The embodiments described herein also provide that the step of splitting the processed data set into at least a first set and a second set, further includes the step of splitting the processed data set into the first data set and second set in a chronological order, the chronological order identifying the order in which each of the rows of the processed dataset were previously created.

The embodiments described herein also provide that the step of splitting the processed data set into at least a first set and a second set, further includes the step of splitting the processed data set into the first set and second set in a pre-specified order, in the event that no chronological order data is available, and randomly shuffling the data items in the processed data set prior to splitting the processed data set.

The embodiments described herein also provide that the method further includes the step of updating the first analytic model in a stateful manner.

The embodiments described herein also provide that the method further includes the step of updating the first analytic model in a stateless manner.

The embodiments described herein also provide that the method further includes the step of converting unstructured data into structured information, and storing the structured information in the form of data sets in a repository, wherein the step of converting unstructured data into structured data includes the following steps: receiving the unstructured data; filtering the unstructured data to identify and retrieving a plurality of sections of unstructured data based on the relevance of the unstructured data to the creation of the analytic model; receiving the sections of unstructured data at a natural language processing engine and breaking the sections into a plurality of meaningful sentences; parsing the plurality of meaningful sentences and retrieving a plurality of keywords from the meaningful sentences; and assigning a weight value and a sentiment value to each of the keywords, and categorizing the keywords into a plurality of categories based on a predetermined categorization criteria thereby converting the unstructured data into structured information.

Referring to FIG. 1, the computer implemented system 100 for automating the generation of an analytic model is shown. The system 100 comprises a repository 10 configured to store a plurality of data sets. The data sets stored in the repository comprise predictor variables which are to be utilized for generating the analytic model. The system 100 further includes a processor 12 configured to process the predictor variables and generate an analytic model.

The processor 12 comprises a determinator 12A configured to determine the total number of records present in each of the data sets stored in the repository 10. The determinator 12A is further configured to identify the columns of the data sets containing only numerical values. Further, the columns of the datasets containing only numerical values are forwarded to a selector 12B. The selector 12B selects a column containing only numerical values (numeric column) from one particular data set (data set under consideration) at a time. The selector 12B further comprises a counter 121 configured to count the number of unique values in the selected column. Further the counter 121 counts the number of total records present in the selected column.

The system 100 further includes a comparator 12C configured to compare the total number of unique values in the selected column with the total number records in the selected column. The comparator 12C compares the number of numeric columns with the total number unique values so as to determine/identify the exact number of columns around which the data is clustered. The number of unique values in the selected column being less than the total number of records in the selected column indicates that the data is clustered around a small group of values, and transformation of such a column and utilization of the same in model generation would be relatively non-cumbersome task. If a particular dataset is clustered around a few unique numerical values, computing a nonlinear transformation such as obtaining the logarithm of the variables would act as a value addition to the quality of the model, and improves the overall quality of analytic models since not only the variables but their respective logarithmic values are also being utilized for the purpose of model generation. The comparator 12C, based on the output of the comparison, selectively transmits the selected column to the transformation module 14.

The transformation module 14 transforms the column transmitted by the comparator 12C by applying a non-linear transformation to each of the values in the selected column. Further, the transformation module replaces the original numeric values present in each of the cells of the column with the respective transformed values.

The system 100 further includes a time stamping module denoted by the reference numeral 16. The time stamping module accesses the columns transformed by the transformation module 14 and determines if there exists any timestamp denoting the date and time on which the data in the cells were created. The time stamping module 16, unlike the comparator module 12C takes into consideration a row of the data set (under consideration) and determines whether the row of data has been time stamped.

In the event that a row of data in the data set under consideration has been time stamped, the time stamping module creates time lags corresponding to each row of data. For example, the time stamping module 16 considers the time elapsed between $n^{th}$ row of data and the $(n+1)^{th}$ row as the first order time lag of data arrival, and associates this time lag with $(n+1)^{th}$ row. Similarly the time stamping module 16 calculates the first order time lags for all the available rows of data. Further, the second order time lag for all the data rows is calculated by considering the time elapsed between $n^{th}$ row of data and the $(n+1)^{th}$ row of data, and associates the calculated second order time lag with the $(n+1)^{th}$ row. In case of availability of time stamps for the row of data under consideration, the time stamping module 16 creates time-lagged variables of pre-determined degrees (first degree and second degree) and evaluates the importance of the time-lagged variables in terms of their contribution to the model quality, and automatically chooses the optimal time lag (either the first order lag or the second order lag). In case of availability of time stamps, the time stamping module 16 also computes variables that indicating how time impacts the observations. An example is the elapsed time for a variable to move from one value to another. The time stamping module 16 computes a library of such variables and provides for automatic evaluation of their utility.

The system 100 further includes a creator 18 configured to create a processed data set. The processed data set comprises transformed values arranged in a tabular format, i.e., in terms of rows and columns. The creator 18 cooperates with a model generator 20 which makes use of the processed data set and creates an analytic model (also referred to as the baseline model) using the processed data set.

The system 100 further includes a model testing module 22 having access to a module quality evaluation metric. The model testing module 22 tests the analytic model developed by the model generator 20. The model testing module comprises 22 a splitter 22A having access to the processed data set used for creating the analytic model. The splitter 22A splits the processed data set into typically a first set and a second set, in accordance with a pre-determined criterion. For example, if the split criterion is 2:1, $\frac{2}{3}^{rd}$ of the earliest data is selected as the model development data and $\frac{1}{3}^{rd}$ of the later data is selected as the test data. However, it is within the scope of the present disclosure that the processed data set can be split into more than two sets. In accordance with another aspect of the present disclosure, 70% of the processed data set is considered as the model development data and the rest (30%) is considered as the model test data.

The testing module 22 further comprises a second selector 22B which select at least one data item for omission from the first set and the second set and creates a new first set and new second set omitting the selected data items. Several factors are taken into consideration by the testing module 22 for selecting a variable for omission. For example, a variable having the lowest information gain against the predicted variable can be dropped, a variable that has the lowest variability is the first one to be dropped and a variable that has missing data can be dropped.

The creation of new first set and the second set provides a base case to evaluate how an analytic model that does not include a particular variable would perform. The second creator 22B transmits the new first set and new second set to the model generator 20 for the creation of a second analytic model.

The model testing module 22 further includes a second comparator 22D which compares the analytic model (baseline model) with the second analytic model and determines whether the quality of the second analytic model is better than the baseline model. The second comparator 22D is further configured to eliminate the data item (which was selected for exclusion) from the new first set and second set in the event that the quality of new analytic model is not inferior to the quality of the baseline model. In the event that the quality of the new analytic model is inferior to the quality of the baseline model, then the data item, initially selected for exclusion would be retained. In this manner an analytic model created by the system 100 is iteratively tested and the quality of the model is improvised upon.

The splitter 22A is configured to split the processed data set into first data set and second set in a chronological order, wherein the chronological order identifies the order in which each of the rows of the processed dataset were previously created. Further, the splitter 22A can also split the processed data set into first set and second set in a pre-specified order, in the event that no chronological order data is available. In such a case, the splitter 22A randomly shuffles the data items of the processed data set prior to splitting the data set.

The system further includes a model updating module 24. The model updating module 24 is configured to update the analytic model, typically the baseline model, in a stateful manner. Stateful model updating is invoked for those model forms where this method can be used. For example, linear regression model can be incrementally built such that only the new data needs to be presented to the model generation along with a minimal state information from the time this model was generated the last time.

The model updating module 24 is also configured to update the analytic model in a stateless manner. Stateless model updating is computationally more expensive. It is done where the underlying analytic model form does not yield itself to the less expensive stateful model updating. For example, a neural network model does not lend itself to an incremental updating where the current model that was built on historical data is relevant with the new data. In such cases, the current model is discarded and the model is fully learnt using the full data that includes as much data as necessary and will include historical data and current data.

For example, consider a model that is generated using data that was generated over a time window indicated by [T1, T2] where T1 is the data start time and T2 is the data end time. After some time has elapsed, new data becomes available over the time window [T2+1, T3]. An analytic model that is amenable to stateful update, is updated/regenerated by the model updating module 24 using just the new [T2+1, T3] data without it discarding what has been modeled over [T1, T2]. An analytic model that is not amenable to stateful update will be updated/regenerated using just the full [T1, T3] data.

The system 100 further comprises a converter 26 configured to convert unstructured data into structured information and store the structured information in the form of data sets in the repository 10 for the purpose of automation of generation of analytic model. Unstructured data is a term used to describe data that is a mixture of textual and non-textual data. Unstructured non-textual data generally relates to media related data such as images, video and audio files. As the volumes of this type of data increases, the need to analyze and understand it grows too. Slightly easier to analyze and less unwieldy are unstructured textual data made up of different file types (documents, spreadsheets and presentations), email messages, social media postings and an array of other files generated and stored on corporate networks. For example determining the level of satisfaction of customers by analyzing emails and social media postings may involve searching for words or phrases.

The converter 26 comprises a receiving module 26A configured to receive the unstructured data. A filter 26B filters the unstructured data to identify and retrieve a plurality of sections of unstructured data based on the relevance of the unstructured data to the creation of the analytic model. Further, a natural language processing tool 26C receives the sections of unstructured data and breaks the sections of unstructured data into a plurality of meaningful sentences using natural language processing tools. A parser 26D parses the plurality of meaningful sentences and retrieves a plurality of keywords from the meaningful sentences.

The converter 26 is further configured to assign a weight value and a sentiment value to each of the keywords, and categorize said keywords into a plurality of categories based on a pre-determined categorization criteria thereby converting said unstructured data into structured information which is stored in the repository 10 and utilized for creating the analytic model. The converter 26 groups the words and phrases into positive, negative or neutral classifications, thereby transforming the unstructured data into structured data where the groups of words found based upon their classification are assigned a value. A positive word may be assigned a numeric value of 1, a negative may be assigned a numeric value of −1 and a neutral may be assigned a numeric value of 0.

The system 100 creates a plurality of analytic models for a given problem. The system 100 considers one of the models as the baseline model and the baseline model will be placed in service until it is replaced. All the models, other than the baseline model are in the background—not in production yet but ready to challenge the incumbent model (baseline model). The baseline model is the model that produces the best performance over the test data. On an ongoing basis, as new data flows through the system 100, each model, including the incumbent baseline model, is evaluated against the new data. The model the produces the best performance over the new data becomes the new baseline model replacing the incumbent.

Figure 2:
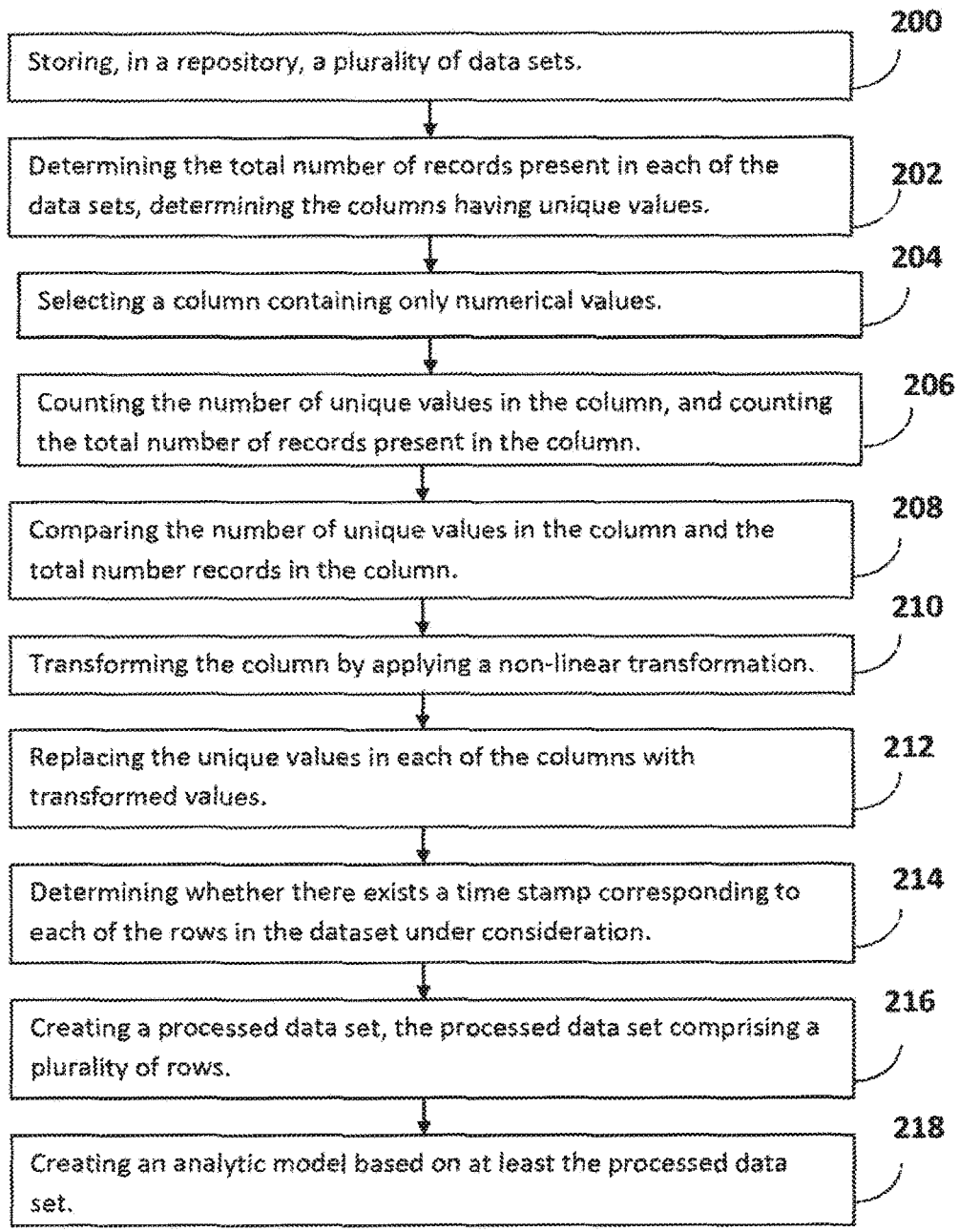
FIG. 2 is a flowchart illustrating the steps involved in the computer-implemented method for automating the generation of business decision analytic model.

Referring to FIG. 2, there is shown a computer implemented method for automating the generation of an analytic model. The method comprises the following computer implemented steps: storing, in a repository, a plurality of data sets, each of the data sets comprising at least predicted variables, the predicted variables utilized for generating the analytic model (200); determining the total number of records present in each of the data sets, and determining the columns of the data sets containing only numerical values (202); selecting a column containing only numerical values, from a dataset under consideration (204); counting the number of unique values in the column, and counting the total number of records present in the column (206); comparing the number of unique values in the column and the total number records in the column (208); transforming the column by applying a non-linear transformation to each of the values in the column and generating respective transformed values, in the event that the number of unique values in the column is less than the total records in the column (210); replacing the unique values in each of the columns with the transformed values (212); determining whether there exists a time stamp corresponding to each of the rows in the dataset under consideration, and calculating a plurality of time lags corresponding to each of the rows, the time lags having predetermined orders (214); creating a processed data set, the processed data set comprising a plurality of rows, each row containing columns having the transformed values (216); and creating an analytic model based on at least the processed data set (218).

The method further comprises the step of evaluating the analytic model using a model quality evaluation metric, the step further comprising the following steps: splitting the processed data set into at least a first set and a second set; selecting at least one data item for omission from the first set and the second set and creating a new first set and new second set, and transmitting the new first set and new second set to the model creator for creation of a second analytic model; and comparing the analytic model with the second analytic model and determine whether the quality of the second analytic model is better than the analytic model, and excluding the data item from the new first set and second set in the event that the quality of new analytic model is not inferior to the quality of the baseline model.

The step of splitting the processed data set into at least a first set and a second set, further includes the step of splitting the processed data set into the first data set and second set in a chronological order, the chronological order identifying the order in which each of the rows of the processed dataset were previously created.

The step of splitting the processed data set into at least a first set and a second set, further includes the step of splitting the processed data set into the first set and second set in a pre-specified order, in the event that no chronological order data is available, and randomly shuffling the data items in the processed data set prior to splitting the processed data set.

The method further includes the step of updating the analytic model in a stateful manner. Additionally or alternatively, the method further includes the step of updating the analytic model in a stateless manner.

The method further includes the step of converting unstructured data into structured data, and storing the structured data in the form of data sets, in a repository, wherein the step of converting unstructured data into structured data includes the following steps: receiving the unstructured data; filtering the unstructured data to identify and retrieving a plurality of sections of unstructured data based on the relevance of the unstructured data to the creation of the analytic model; receiving the sections of unstructured data at a natural language processing engine and breaking the sections into a plurality of meaningful sentences; parsing the plurality of meaningful sentences and retrieving a plurality of keywords from the meaningful sentences; and assigning a weight value and a sentiment value to each of the keywords, and categorizing the keywords into a plurality of categories based on a pre-determined categorization criteria thereby converting the unstructured data into structured data.

Figure 3:
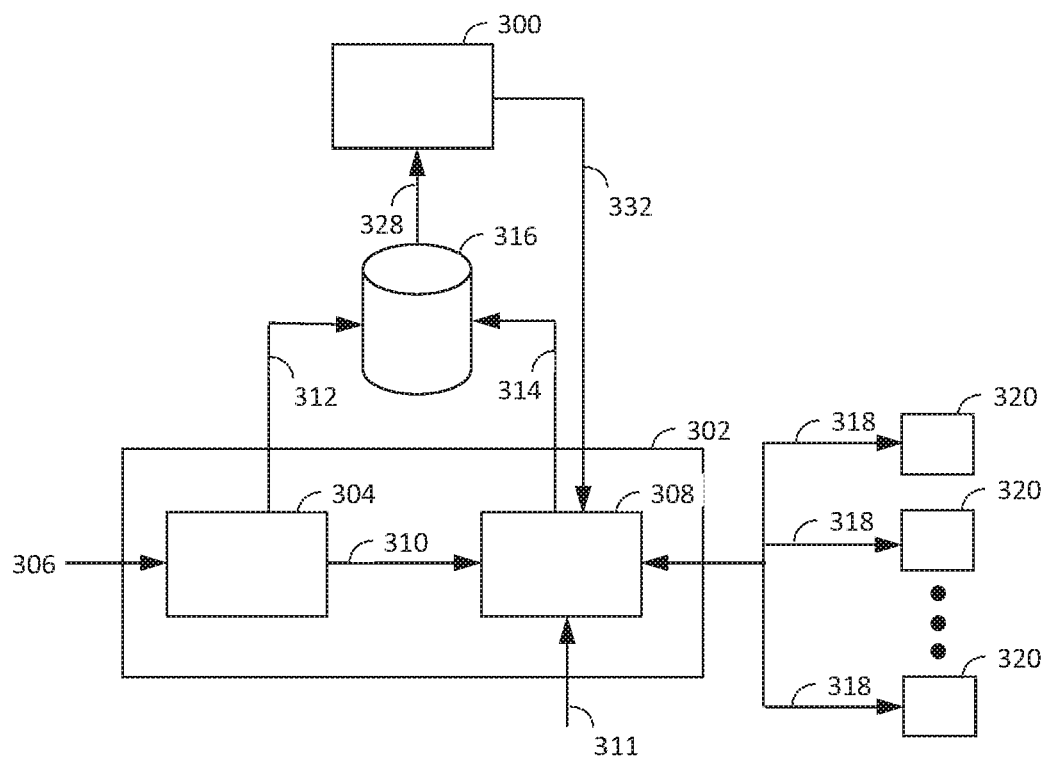
FIG. 3 is a block diagram of an example environment in which the system shown in FIG. 1 may be used to automate generation of an analytic/predictive model Although the specific features of the embodiments herein are shown in some drawings and not in others, this has been done for convenience only as each feature of the disclosure may be combined with any or all of the other features in accordance with the embodiments herein.

FIG. 3 is a block diagram of an example environment in which embodiments of system 100, designated system 300, may be used to automate generation of an analytic/predictive model. In the example environment, client 302 receives a plurality of sales leads 306 and/or additional sales leads 311, and pursues at least a portion of sales leads 306 and/or 311 as sales opportunities 318, i.e., potential transactions, with each of a plurality of customers 320 of client 302. System 300 predicts outcomes of sales opportunities 318 based on information 314 recorded by client 302 during pursuit of sales opportunities 318. For example, client 302 has finite resources with which to pursue sales opportunities 318, and client 302 uses system 300 to facilitate scoring a likelihood that each sales opportunity 318 will be closed successfully, and/or to facilitate prioritizing sales opportunities 318 based on a likelihood of a successful closing.

More specifically, in the example embodiment, client 302 receives sales leads 306 regarding potential customers. For example, but not by way of limitation, sources of sales leads 306 include at least one of a registration card filled out by a potential customer 320 at a trade show booth maintained by client 302, a contact card filled out by a potential customer 320 at a conference presented or sponsored by client 302, an on-line registration by a potential customer 320 for a webinar presented or sponsored by client 302, information obtained from a potential customer 320 in the course of visiting a website associated with client 302, and any other suitable expression of interest in client 302 from a potential customer 320.

In the example embodiment, client 302 obtains information 312 associated with each sales lead 306. In certain embodiments, client 302 includes an inside sales department 304 that investigates sales leads 306 to obtain at least a portion of information 312 associated with sales leads 306. For example, inside sales department 304 develops information 312 by researching business details and activities of the potential customer 320 associated with each sales lead 306 and/or contacting the associated potential customer 320 to gauge a level of interest in products or services offered by client 302. Additionally or alternatively, client 302 obtains additional information 312 regarding sales leads 306 in any suitable fashion.

In certain embodiments, inside sales department 304 transmits information 312 associated with sales leads 306 to a customer relationship management (CRM) database 316. In the example embodiment, CRM database 316 is a commercial internet-accessible database maintained by a third party. In alternative embodiments, CRM database 316 is an internal database maintained by client 302. CRM database 316 facilitates organization and analysis of information 312. In alternative embodiments, information 312 associated with sales leads 306 is stored in any suitable fashion by client 302.

In the example embodiment, inside sales department 304 identifies a subset of sales leads 306 as marketing qualified leads 310. More specifically, each marketing qualified lead 310 is a sales lead 306 that satisfies at least one selected criterion for likelihood of success of a sales opportunity 318 with the potential customer 320 associated with respective sales lead 306. In the example embodiment, marketing qualified leads 310 are transmitted to an outside sales department 308 of client 302 for pursuit as sales opportunities 318 with customers 320. Additionally or alternatively, outside sales department 308 receives additional sales leads 311 from any suitable source for pursuit as sales opportunities 318 with customers 320. In alternative embodiments, each marketing qualified lead 310 and/or additional sales lead 311 is pursued with customers 320 in any suitable fashion by client 302.

In the example embodiment, outside sales department 308 pursues each sales opportunity 318 with the associated potential customer 320 and records information 314 pertaining to a status of the respective sales opportunity 318. In certain embodiments, outside sales department 308 transmits information 314 associated with sales opportunities 318 to CRM database 316. In alternative embodiments, information 314 associated with sales opportunities 318 is stored in any suitable fashion by client 302. In some embodiments, information 312 for the sales lead 306 from which each sales opportunity 318 originated is appended to, or otherwise included within, information 314 for the respective sales opportunity 318.

For example, CRM database 316 includes data fields for storage of typical elements of information 314, such as, but not limited to, date of creation of the associated sales lead 306, date of conversion of the associated sales lead 306 to sales opportunity 318, primary or relevant industry of potential customer 320, date and type (e.g., in person, via telephone, via email) of each contact of potential customer 320 by outside sales department 308, identity of sales personnel of client 320 that is/are handling sales opportunity 318, date of transmission of pricing information to potential customer 320, estimated value of transaction associated with sales opportunity 318 and date of estimate, number of employees of potential customer 320, annual revenue (reported or estimated) of customer 320, other demographic data associated with potential customer 320, and additional notes added by outside sales department 308. In some embodiments, a progress of each sales opportunity 318 is categorized as being in one of a plurality of stages based on predetermined criteria, and CRM database 316 includes data fields for entry into each stage and date of entry. Moreover, for historical sales opportunities 318 that already have been pursued to completion, CRM database 316 includes data in additional data fields such as, but not limited to, closure date of sales opportunity 318 and win/loss outcome of sales opportunity 318, i.e., an indication that the respective sales opportunity 318 led to one of (i) a successfully closed sales opportunity 318, i.e. a successfully completed transaction, with potential customer 320, characterized as a "win," and (ii) a rejected or abandoned sales opportunity 318, characterized as a "loss."

In the example embodiment, system 300 facilitates selection of currently active sales opportunities 318 for continued pursuit by client 302. In particular, system 300 uses information 314 for historical sales opportunities 318 to build a predictive model as described above, and system 300 further uses the model to score a relative likelihood that each current sales opportunity 318 will result in a successfully closed sales opportunity 318, and/or to prioritize current sales opportunities 318 for attention by outside sales department 308 by ranking the current sales opportunities 318 based on the respective likelihood that each will result in a successfully closed transaction. System 300 transmits output 332 to client 302 that includes such scores and/or prioritization rankings. In alternative embodiments, output 332 includes any suitable representation of the likelihood of successfully closing each sales opportunity 318. For example, client 302 uses output 332 to select sales opportunities 318 that are most worthy of continued use of the resources of outside sales department 308.

In certain embodiments, CRM database 316 serves as repository 10 described above with respect to FIG. 1. For example, system 300 receives at least a portion of information 314 as plurality of data sets 328 from CRM database 316. Each data set 328 is associated with a respective sales opportunity 318 and is alternately referred to herein as a row of data. A set of values for a given data field of CRM database 316 across plurality of data sets 328 is characterized herein as a column of data. In some embodiments, at least one column of data within plurality of data sets 328 is suitably transformed by transformation module 14, as described above with reference to FIG. 1. Alternatively, transformation module 14 is not applied to any column within plurality of data sets 328.

In some embodiments, time stamping module 16 described above with reference to FIG. 1 adds additional columns to plurality of data sets 328. More specifically, as described above, time stamping module 16 identifies a plurality of date values in each data set 328 (i.e., in each row of data), calculates a time lag between each pair of date values, and stores each time lag result as a respective new elapsed-time variable associated with the data set 328, thereby adding respective new columns to plurality of data sets 328. For example, but not by way of limitation, the new variables include a current age of sales opportunity 318, an elapsed time between creation of sales opportunity 318 and entry of sales opportunity 318 into a first of the plurality of stages, an elapsed time between creation of sales opportunity 318 and entry of sales opportunity 318 into a second of the plurality of stages, an elapsed time between entry of sales opportunity 318 into the first of the plurality of stages and entry of sales opportunity 318 into the second of the plurality of stages, respective elapsed times for movement between any pair of the plurality of stages, an elapsed time after transmission of pricing information to potential customer 320, and respective elapsed times between any additional pair of dated events in each data set 328. In alternative embodiments, time stamping module 16 does not add new columns to plurality of data sets 328.

In certain embodiments, converter 26 described above with reference to FIG. 1 filters unstructured data within plurality of data sets 328 to generate at least one additional variable that includes structured information better suited for use by system 300. For example, in some embodiments, a portion of information 314 is entered into CRM database 316 as free text notes regarding organizational and/or financial details of potential customer 320. In alternative embodiments, unstructured data is stored as part of information 314 in any suitable fashion.

In some embodiments, converter 26 derives a value for each data set 328 for the at least one additional variable by extracting keywords from the unstructured information associated with the respective data set 328, assigning weight and sentiment values to each keyword to produce structured data for the respective data set 328, and adding the structured data as the value in the at least one additional column in plurality of data sets 328. As one illustrative example, converter 26 adds a financial condition variable to plurality of data sets 328. A free text note in data set 328 associated with one sales opportunity 318 indicates that the associated potential customer 320 executed a lay-off of employees within the past six months, and converter 26 extracts the information from the free text note and assigns a weighted negative value to the financial condition variable for that data set 328. A free text note in data set 328 associated with another sales opportunity 318 indicates that the associated potential customer 320 received new investor backing within the past six months, and converter 26 extracts the information from the free text note and assigns a weighted positive value to the financial condition variable for that data set 328. Although converter 26 is described as adding a financial condition variable, in the example embodiment the at least one variable includes any suitable type and number of characteristics of sales opportunity 318 and/or the associated potential customer 320.

Additionally or alternatively, CRM database 316 is configured to parse and evaluate unstructured portions of information 314 as information 314 is received by CRM database 316, such that at least one corresponding variable based on the extracted structured data is added to data sets 328 prior to their receipt by system 300. In other alternative embodiments, values for structured data extracted from unstructured data are not added to plurality of data sets 328.

In the example embodiment, model generator 20 and model testing module 22, each described above with reference to FIG. 1, cooperate to generate a plurality of comparison analytic models for a given model type. For example, splitter 22A, also described above with reference to FIG. 1, splits plurality of data sets 328 into model development data sets 328 (i.e., model development rows) and test data sets 328 (i.e., test rows). From the full set of model variables (i.e. from the full set of columns, including in some embodiments the additional columns generated by time stamping module 16 and/or converter 26 as described above) included in plurality of data sets 328, second selector 22B selects a plurality of different subsets of columns, and model generator 20 generates, for each subset of columns using only the data rows currently selected for model development, a corresponding comparison analytic model of the given model type.

For example, in some embodiments, model generator 20 is configured to select at least one of the subsets of model variables by (i) generating a baseline model of the given model type based on the full set of model variables, including the additional variables generated by time stamping module 16 and/or converter 26, if any, (ii) calculating an information gain for each model variable against the predicted variable, and omitting from the at least one subset the model variable having the lowest information gain. Additionally or alternatively, model generator 20 is configured to select at least one of the subsets of the plurality of model variables by calculating a variability of the values of each model variable, and omitting from the at least one subset the model variable having the lowest variability. Additionally or alternatively, model generator 20 is configured to select at least one of the subsets of the plurality of model variables by determining, for each model variable, a number of data sets 328 for which the value of the model variable indicates missing data, and omitting from the at least one subset the model variable having the greatest determined number of data sets 328 with missing data. Additionally or alternatively, model generator 20 is configured to select at least one of the subsets of model variables in any suitable fashion that enables system 300 to function as described herein. In certain embodiments, at least one of the above-listed methods is applied iteratively to facilitate reducing a number of model variables included in a final production analytic model.

Model testing module 22 then selects an operational analytic model of the given model type from among the plurality of comparison analytic models based on the quality metric, described above with reference to FIG. 1, applied to each of the plurality of comparison analytic models. For example, but not by way of limitation, model testing module 22 applies each comparison analytic model to the designated test rows of plurality of data sets 328, and compares a win/loss outcome predicted by the comparison analytic model for each sales opportunity 318 in the test data rows to an actual win/loss outcome for the respective sales opportunity 318. The one of the plurality of comparison analytic models with that outperforms the others according to the quality metric is selected as the operational analytic model.

Moreover, in the example embodiment, model generator 20 is further configured to create a respective plurality of comparison analytic models for each of a plurality of model types. For example, but not by way of limitation, model generator 20 generates both a plurality of linear regression comparison analytic models, each based on a different subset of columns of plurality of data sets 328, and a plurality of neural network comparison analytic models, also each based on a different subset of columns of plurality of data sets 328. Similarly, model testing module 22 is further configured to select a respective operational analytic model for each model type based on the quality metric applied to each of the plurality of comparison analytic models of that model type. For example, model testing module 22 selects an operational linear regression analytic model from among the plurality of linear regression comparison analytic models, and selects an operational neural network analytic model from among the plurality of neural network comparison analytic models. Although the example refers to just two different types of operational analytic models, system 300 generates and maintains operational analytic models for any suitable number of model types. Moreover, because model generator 20 and model testing module 22 develop the operational analytic model independently for each model type, in certain embodiments the operational analytic model for one model type includes a different subset of columns from data sets 328 than does the operational analytic model for another model type. Thus, system 300 automatically provides multiple opportunities to identify the most effective model variables while limiting constraints on variable selection imposed by model type.

Additionally in the example embodiment, system 300 includes a model selection module configured to select a production analytic model from among the operational analytic models of each model type based on the quality metric applied to the operational analytic models of each model type. For example, in an embodiment, the model selection module selects as the production analytic model the operational linear regression analytic model because the operational linear regression analytic model outperforms the operational analytic model of other model types according to the quality metric. In the example embodiment, system 300 applies the selected production analytic model to data sets 328 associated with new sales opportunities 318 on an ongoing basis to generate output 332 representing a likelihood of successfully closing each new sales opportunity 318. In certain embodiments, only output 332 from the selected production analytic model is provided to client 302. However, as described above, the operational analytic models of the other model types not selected as the production analytic model also are applied to data sets 328 associated with new sales opportunities 318 on an ongoing basis, running in the background as described above, and system 300 stores the output representation generated by each operational analytic model of the likelihood of successfully closing each new sales opportunity 318.

In some embodiments, the addition of a large number of additional model variables by time stamping module 16 and/or converter 26, i.e. the addition of a large number of columns to plurality of data sets 328 as described above, would tend to increase an amount of computational resources needed to generate, apply on an ongoing basis, and regenerate as needed a number of operational models of different model types, as described herein. However, in some such embodiments, the selection by model testing module 22 of the operational analytic model of each model type from among automatically generated candidate models each having different, strategically reduced subsets of columns, as described above, tends to decrease the computational resources needed to run the several operational model types on an ongoing basis. Thus, system 300 enables generation of a relatively efficient model even after intensive evaluation of a relatively large number of added variables.

As system 300 continues to provide output 332 over time based on the production analytic model, data sets 328 that initially were associated with new sales opportunities 318 are updated with actual "win/loss" results for the respective sales opportunities 318. In some embodiments, model updating module 24, described above with reference to FIG. 1, evaluates a predictive performance of the operational analytic model of each model type based on the updated data sets 328. For example, model updating module 24 compares the later-received actual win/loss results to the initial model predictions for the respective sales opportunities 318 made by the operational analytic model of each model type. If the predictive performance of the operational analytic model of another model type, running in the background, outperforms the predictive performance of the production analytic model, model updating module 24 reselects the other, currently better-performing model type to apply to new sales opportunities 318 as the production analytic model going forward. As described above, the operational analytic model for each of the remaining model types, including the now-deselected model type, also are applied to data sets 328 associated with new sales opportunities 318 on an ongoing basis, running in the background as described above.

In certain embodiments, as system 300 continues to provide output 332 over time based on the currently selected production analytic model, the predictive performance of the operational analytic model of at least one model type deteriorates below a predetermined threshold value. Model updating module 24 is configured to respond by instructing time-stamping module 16, model generator 20, and model testing module 22 to regenerate the operational analytic model of the at least one model type, based at least in part on data sets 328 received subsequent to the previous generation of the operational analytic model of the at least one model type. In some embodiments, time-stamping module 16, model generator 20, and model testing module 22 are configured to regenerate at least one type of model in a stateless manner, as described above. Additionally or alternatively, time-stamping module 16, model generator 20, and model testing module 22 are configured to regenerate at least one model type in a stateful manner, as described above.

Embodiments of the systems and methods described herein provide for generation of an analytic/predictive model based on information related to a plurality of historical opportunities. For example, the analytic model scores a likelihood that a transaction based on a current opportunity will be closed successfully, and/or prioritizes current opportunities based on a likelihood of successfully closing a potential transaction based on the respective opportunity. The embodiments thus enable a client to allocate its sales department resources proportionately to opportunities that are the most likely to yield successfully closed transactions.

A technical effect of the embodiments and systems described herein includes at least one of (i) deriving values for a plurality of elapsed-time variables for each opportunity, wherein each elapsed-time variable represents an elapsed time between a respective pair of dated events associated with the respective opportunity, (ii) creating a plurality of comparison analytic models, each comparison analytic model based on a different subset of the plurality of model variables, wherein each comparison analytic model is configured to operate on new data sets associated with current opportunities and output a representation of a likelihood of successfully closing a respective transaction associated with each current opportunity, and (iii) calculating a quality metric for each of the plurality of comparison analytic models and selecting an operational analytic model from among the plurality of comparison analytic models based on the quality metric.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer implemented system for automating the generation of an analytic model, said system comprising:
  a processor communicatively coupled to a database, the database configured to store a plurality of data sets, each of the data sets comprising values for a plurality of variables, said processor configured to process the data sets, said processor comprising:
  a time-stamping module configured to derive values for a plurality of elapsed-time variables for each data set, wherein each elapsed-time variable represents an elapsed time between a respective pair of dated events associated with the respective data set, the plurality of variables and the plurality of elapsed-time variables included in a plurality of model variables;
  a model generator configured to create a plurality of comparison analytic models, each comparison analytic model based on a different subset of the plurality of model variables, wherein each comparison analytic model is configured to operate on new data sets associated with current opportunities, and to output a representation of a likelihood of successfully closing each current opportunity; and
  a model testing module configured to select an operational analytic model from among the plurality of comparison analytic models based on a quality metric applied to each of the plurality of comparison analytic models.

2. The system according to claim 1, wherein:
  the model generator is further configured to create a respective plurality of comparison analytic models for each of a plurality of model types, each comparison analytic model within each model type based on a different subset of the plurality of model variables, and
  the model testing module is further configured to select a respective operational analytic model for each model type from among the plurality of comparison analytic models of the corresponding model type based on the quality metric applied to each of the plurality of comparison analytic models,
  said system further comprising a model selection module configured to select a production analytic model from among the operational analytic models of each model type based on the quality metric applied to the operational analytic models of each model type, wherein the system is configured to report the output representation of the production analytic model for each current opportunity.

3. The system according to claim 2, wherein the system is configured to apply the operational analytic models other than the selected production analytic model to the new data sets associated with the current opportunities on an ongoing basis, and to store the resulting output representations of each operational analytic model.

4. The system according to claim 3, wherein said system further comprises a model updating module configured to:
   receive updated data sets each indicating an actual result associated with the respective data set; and
   evaluate a predictive performance of the operational analytic model of each model type based on the updated data sets.

5. The system according to claim 4, wherein the model updating module is further configured to reselect the production analytic model from among the operational analytic models of each model type based on the predictive performance of the operational analytic models of each model type.

6. The system according to claim 4, wherein the model updating module is further configured to instruct the time-stamping module, the model generator, and the model testing module to regenerate the operational analytic model of at least one model type, based at least in part on the updated data sets, in response to the predictive performance of the operational analytic model of the at least one model type being less than a threshold value.

7. The system according to claim 6, wherein the model updating module is further configured to instruct the time-stamping module, the model generator, and the model testing module to regenerate the operational analytic model of the at least one model type in a stateful manner.

8. The system according to claim 6, wherein the model updating module is further configured to instruct the time-stamping module, the model generator, and the model testing module to regenerate the operational analytic model of the at least one model type in a stateless manner.

9. The system according to claim 1, wherein the model generator is further configured to create each comparison analytic model configured to output the representation of the likelihood of successfully closing each current opportunity as one of (i) a score indicating a relative likelihood that each current opportunity will be successfully closed, and (ii) a prioritized ranking of the current opportunities based on the respective likelihood that each current opportunity will be successfully closed.

10. The system according to claim 1, further comprising a converter configured to add at least one additional variable to the plurality of model variables, the converter further configured to derive values for the at least one additional variable by converting unstructured data associated with at least one data set into structured data associated with the respective data set.

11. A method for automating generation of an analytic model, said method comprising the following computer-implemented steps:
    accessing a plurality of data sets, each of the data sets including values for a plurality of variables;
    deriving values for a plurality of elapsed-time variables for each data set, wherein each elapsed-time variable represents an elapsed time between a respective pair of dated events associated with the respective data set, the plurality of variables and the plurality of elapsed-time variables included in a plurality of model variables;
    creating a plurality of comparison analytic models, each comparison analytic model based on a different subset of the plurality of model variables, wherein each comparison analytic model is configured to operate on new data sets associated with current opportunities, and to output a representation of a likelihood of successfully closing each current opportunity;
    calculating a quality metric for each of the plurality of comparison analytic models; and
    selecting an operational analytic model from among the plurality of comparison analytic models based on the quality metric.

12. The method according to claim 11, further comprising:
    creating a respective plurality of comparison analytic models for each of a plurality of model types, each comparison analytic model within each model type based on a different subset of the plurality of model variables;
    calculating the quality metric for each of the plurality of comparison analytic models of each model type;
    selecting, for each model type, an operational analytic model from among the plurality of comparison analytic models of the model type based on the quality metric;
    selecting a production analytic model from among the operational analytic models of each model type based on the quality metric; and
    reporting the output representation of the production analytic model for each current opportunity.

13. The method according to claim 12, further comprising:
    applying the operational analytic models other than the selected production analytic model to the new data sets associated with the current opportunities on an ongoing basis;
    storing the resulting output representations of each operational analytic model.

14. The method according to claim 13, further comprising:
    receiving updated data sets each indicating an actual result associated with the respective data set; and
    evaluating a predictive performance of the operational analytic model of each model type based on the updated data sets.

15. The method according to claim 14, further comprising reselecting the production analytic model from among the operational analytic models of each model type based on the predictive performance of the operational analytic models of each model type.

16. The method according to claim 14, further comprising regenerating the operational analytic model of at least one model type, based at least in part on the updated data sets, in response to the predictive performance of the operational analytic model of the at least one model type being less than a threshold value.

17. The method according to claim 16, wherein regenerating the operational analytic model of the at least one model type comprises regenerating the operational analytic model of the at least one model type in a stateful manner.

18. The method according to claim 16, wherein regenerating the operational analytic model of the at least one model type comprises regenerating the operational analytic model of the at least one model type in a stateless manner.

19. The method according to claim 11, wherein creating the plurality of comparison analytic models further comprises creating each comparison analytic model configured to output the representation of the likelihood of successfully closing each current opportunity as one of (i) a score indicating a relative likelihood that each current opportunity will be successfully closed, and (ii) a prioritized ranking of the current opportunities based on the respective likelihood that each current opportunity will be successfully closed.

20. The method according to claim 11, further comprising:
adding at least one additional variable to the plurality of model variables; and
deriving values for the at least one additional variable by converting unstructured data associated with at least one data set into structured data associated with the respective data set.

21. A non-transitory computer-readable medium having computer-executable instructions for automating generation of an analytic model, wherein when executed by at least one processor, the computer-executable instructions cause the at least one processor to:
access a plurality of data sets, each of the data sets including values for a plurality of variables;
derive values for a plurality of elapsed-time variables for each data set, wherein each elapsed-time variable represents an elapsed time between a respective pair of dated events associated with the respective data set, the plurality of variables and the plurality of elapsed-time variables included in a plurality of model variables;
create a plurality of comparison analytic models, each comparison analytic model based on a different subset of the plurality of model variables, wherein each comparison analytic model is configured to operate on new data sets associated with current opportunities, and to output a representation of a likelihood of successfully closing each current opportunity;
calculate a quality metric for each of the plurality of comparison analytic models; and
select an operational analytic model from among the plurality of comparison analytic models based on the quality metric.

22. The non-transitory computer-readable medium according to claim 21, wherein the computer-executable instructions further cause the at least one processor to:
create a respective plurality of comparison analytic models for each of a plurality of model types, each comparison analytic model within each model type based on a different subset of the plurality of model variables;
calculate the quality metric for each of the plurality of comparison analytic models of each model type;
select, for each model type, an operational analytic model from among the plurality of comparison analytic models of the model type based on the quality metric;
select a production analytic model from among the operational analytic models of each model type based on the quality metric; and
report the output representation of the production analytic model for each current opportunity.

23. The non-transitory computer-readable medium according to claim 21, wherein the computer-executable instructions further cause the at least one processor to:
apply the operational analytic models other than the selected production analytic model to the new data sets associated with the current opportunities on an ongoing basis; and
store the resulting output representations of each operational analytic model.

* * * * *